United States Patent [19]

Van Eenam

[11] 4,269,951

[45] May 26, 1981

[54] PURIFICATION OF WET STRENGTH RESINS

[75] Inventor: Donald N. Van Eenam, Des Peres, Mo.

[73] Assignee: Monsanto Company, St. Louis, Mo.

[21] Appl. No.: 150,790

[22] Filed: May 19, 1980

[51] Int. Cl.$^3$ ............................ C08F 8/08; C08F 8/24; C08F 8/32
[52] U.S. Cl. ............................ 525/359; 260/29.2 EP; 260/29.6 HN; 260/29.6 PT; 525/336; 528/483; 528/499; 528/501
[58] Field of Search ............................ 525/359, 336; 260/29.2 EP, 29.6 HN, 29.6 PT; 538/483, 501

[56] References Cited

U.S. PATENT DOCUMENTS

| | | | |
|---|---|---|---|
| 3,007,887 | 11/1961 | Essig | 528/501 |
| 3,177,181 | 4/1965 | Baum et al. | 528/501 |
| 3,453,182 | 7/1969 | Reber et al. | 528/501 |
| 4,226,957 | 10/1980 | Van Eenam | 525/359 |
| 4,226,974 | 10/1980 | Goodman et al. | 528/483 |

*Primary Examiner*—William F. Hamrock
*Attorney, Agent, or Firm*—David Bennett; William J. Farrington; Edward P. Grattan

[57] ABSTRACT

Certain wet strength resins based on the epichlorohydrin/polyamine reaction which are characterized by extremely long gel times can be purified from epichlorohydrin residuals by azeotropic distillation.

8 Claims, No Drawings

PURIFICATION OF WET STRENGTH RESINS

BACKGROUND OF THE INVENTION

This invention relates to a process for the purification of certain wet strength resins and specifically the resins produced by the process described in U.S. application Ser. No. 21,414.

The resins involved are obtained by reacting, in an aqueous medium maintained at a temperature of 20° C. or less, an epihalohydrin and a polymer comprising a backbone formed of repeating segments at least 10% of which comprise an amine group and/or partial salts thereof, substantially all of the amine groups being tertiary amine groups pendant from the polymer backbone and having a structure selected from the group consisting of

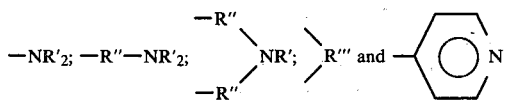

wherein R' is either methyl or, where the nitrogen atom bears two R' groups, these together with the nitrogen can form a heterocyclic ring; R" is a divalent radical and R'" is a trivalent radical; with the unattached bond in each amine structure being attached directly to a carbon atom of the polymer backbone. The ratio of epihalohydrin molecules to tertiary amine groups in the reaction mixture is such that the transition ratio is equalled or exceeded.

The transition ratio represents a dividing line between the resins of the prior art and those obtained by the above process. The latter are characterized by their exceedingly long gel times which may be one or more orders of magnitude longer than those characterizing the resins of the prior art. The gel time is the time taken for a given resin solution or emulsion to set up, (that is to cross-link three dimensionally), once the pH is raised to a level at which the resin is activated, generally above about 8.

The resins obtained by the above process are styled "perepiquat" resins and that term shall be used in this specification. Perepiquat resins are characteristically reaction products of a poly(tertiary amine) with an epihalohydrin which have a gel time in excess of 100 minutes for a 10% solids solution at room temperature and a pH of from 10 to 13.

DISCUSSION OF THE PRIOR ART

Polymers produced by the prior art processes, as indicated above, are characterized by very short gel times such that, in the activated form, it is not possible to employ conventional purification techniques. In the stabilized, non-activated form, i.e. at a pH below about 6, the major impurity is usually a dihalopropanol (from the reaction of uncoverted epihalohydrin with acid) and this seems to have a strong affinity for the resin and water such that it cannot be successfully removed by distillation. Above a pH of about 8, raising the temperature greatly accelerates gelation such that purification becomes impracticable. Thus in the prior art, attempts are not usually made to separate unreacted epihalohydrin or dihalopropanol from the resin and the existence of otherwise undesirable efficiency-sapping side reactions during use as wet strength resins is tolerated.

Not only does the presence of unreacted monomers reduce efficiency but it is wasteful in that the epichlorohydrin is a relatively expensive component.

It is therefore advantageous, from several points of view, to remove any unreacted dichloropropanol or epichlorohydrin from the resin before it is used and the present invention provides a technique by which this can be done for perepiquat resins.

DESCRIPTION OF THE INVENTION

The present invention provides a process for removing epihalohydrin and dihalopropanol impurities from an aqueous solution of a perepiquat resin which comprises adjusting the pH of the solution to a value in the range 8 to 13 and volatilizing from the solution, at a temperature below 40° C., an azeotrope of water and epihalohydrin.

The adjusting of the pH to the above range has the effect of converting the dihalopropanol to the corresponding epihalohydrin which readily forms an azeotrope with water and is removed as such. The preferred pH range is 10 to 13 and most conveniently from 10.5 to 11.5 because at such pH levels the above conversion is largely complete. At pH levels in this range the perepiquat resin is converted to its epoxy or activated form.

The volatilization is preferably achieved by sparging an inert gas through the solution such that the azeotrope is entrained with the gas stream and removed. The inert gas can be nitrogen, air, argon or the like. The preferred gas is nitrogen.

The process can be assisted by use of sub-atmospheric pressures if desired and in some circumstances the use of such low pressures will make sparging unnecessary. The preferred process uses both sparging and subatmospheric pressures.

The temperature at which the purification proceeds has a very significant effect on both the gel time of the resin and on the rate at which the azeotrope is removed. In practice the purification temperature should be between 0° and 40° C. and preferably 15° to 25° C.

The process of the invention can be applied to a solution with any desired solids content but in practical terms the solids content is most conveniently from 5 to 50% by weight and preferably from 10 to 30% by weight.

A preferred process utilizes an aqueous resin solution at a temperature of from 15° to 25° C. and a pH of from 10 to 13 through which air is bubbled and from which the sparged air along with an entrained water-/epihalohydrin azeotrope is removed at pressures below 0.5 kg./sq.cm and most preferably at laboratory vacuum pressures. Any other process that increases the surface/volume ratio of the solution, thus making volatilization of the azeotrope easier, can also be used. One such approach would be the use of an extraction column in which the solution passes down the column against a counter current of gas which entrains the azeotrope. Another might be an adaptation of a wiped film devolatilizer. All such expedients and others achieving the same affect are considered within the purview of this invention.

As the removal of the epihalohydrin proceeds the pH drops and more alkali may need to be added to maintain the pH at the desired level. This variation is also within the scope of this invention.

The preferred perepiquat resin is one having a gel time as a 10% solids aqueous solution of at least 100 and preferably from 1000 to 8000 minutes or even longer at room temperature and a pH of 10 to 13. Particularly preferred resins are based on the reaction of epichlorohydrin with a polymer (including a copolymer) of N-methyl diallylamine, vinyl benzyl dimethylamine, dimethylaminoethyl methacrylate and the like, which polymers are characterized by tertiary amine groups that are pendant from a polymer chain and are readily quaternized by reaction with the epichlorohydrin. Other forms of perepiquat resins area described in U.S. application Ser. No. 21,414 which is incorporated herein by reference.

The most preferred epihalohydrin is epichlorohydrin (EPI) and the effectiveness of the process of the invention using EPI can be gauged from a consideration of the EPI/water azeotropic boiling point and the composition of the EPI/water azeotrope by weight.

TABLE 1

| | Binary Azeotropes Containing Water | | | |
|---|---|---|---|---|
| | B.P. in °C. at 760 mm | | % by wt. in Azeotrope | |
| Compound | Compound | Azeotrope | Water | Compound |
| Epichlorohydrin | 117 | 88.5 | 26% | 76% |
| Dichloropropanol* | 182 | 99.4 | 88.7% | 11.3% |

*2,3 dichloropropanol.

The 1,3-dichloropranol-2 isomer has a boiling point of 174° C.

From this it will be observed that a second azeotrope, dichloropranol/water, is potentially involved. However since, at the relevant pH range, the removal of epichlorohydrin will allow further dehydrohalogenation of the dichloropropanol to form epichlorohydrin to occur and since the epichlorohydrin azeotrope boils at a temperature 11° C. below that of the dichloropropanol azeotrope, it will be appreciated that the dominant mechanism for removal of dichloropropanol is via conversion to epichlorohydrin. The dehydrohalogenation reaction occurs readily during resin activation of pH 10–13 and though the reaction is reversible, at those pH levels the equilibrium is displaced well over towards formation of epichlorohydrin.

DESCRIPTION OF A PREFERRED EMBODIMENT

The invention is further described by reference to the following Example which is for the purposes of illustration only and is intended to imply no limitations on the essential scope of the invention.

EXAMPLE

A 25 ml pyrex test-tube was charged with approximately 5 ml of a 20% solution of a perepiquat polymer obtained by reacting poly(N-methyl diallylamine) with epichlorohydrin in a EPI/amine group ratio of 1.75 at a temperature of 5° C. rising to room temperature during a 24 hour reaction period. A pipette was introduced into the tube such that the end touched the bottom of the tube and a moderate flow of sparging nitrogen was initiated. Aqueous sodium hydroxide solution was added dropwise and the steadily rising pH was monitored. All operations were performed at ambient temperatures.

When the pH reached 11.52 and the temperature was 24° C., the sodium hydroxide addition was stopped. The nitrogen flow caused azeotropic removal/volatilization of epichlorohydrin for about 4 to 5 minutes, the odor being very readily detectable. Gradually thereafter the intensity of the epichlorohydrin odor in the sparging gas flow and in the immediate vicinity of the solution diminished and finally disappeared.

The nitrogen sparging was continued for a total time of 10 minutes after which the solution temperature was 19° C. and the pH was 11.48. Because water was lost along with the epichlorohydrin the solution was slightly more viscous. Addition of 1 ml of water gave a clear, colorless, odorless resin solution with a pH of about 11.3.

Filter paper circles, when wetted with a 1.0% aqueous solution of the purified perepiquat resin solution and allowed to dry/air-heat cure in a 120° C. circulating air oven for 7 minutes exhibited excellent wet tensile strength showing that the perepiquat resin had lost none of its effectiveness as a result of the removal of the unreacted epichlorohydrin.

A perepiquat resin, stripped of epichlorohydrin monomer by the above process and stabilized by a reduction of the pH to 4.5 maintained its original wet strength efficiency. This demonstrates the impressive stability to degradation possessed by the perepiquat resins even after the demonomerization process.

What is claimed is:

1. A process for the removal of epihalohydrin and dihalopropanol impurities from an aqueous solution of a perepiquat resin which process comprises adjusting the pH of the solution to a value in the range 8 to 13 and volatilizing from the solution, at a temperature below 40° C., an azeotrope of epihalohydrin and water.

2. A process according to claim 1 in which the perepiquat resin has a gel time in a 10% solids aqueous solution at a pH of 10 to 13 of at least 100 minutes and is the reaction product of an epihalohydrin with a polymer characterized by having a plurality of tertiary amine groups pendant from the polymer chain.

3. A process according to claim 1 in which the azeotrope is volatilized at a pressure of less than 0.5 kg/sq.cm.

4. A process according to claim 1 in which the azeotrope is volatilized using a sparging flow of an inert gas.

5. A process according to claim 1 in which the reaction temperature is from 15° to 25° C.

6. A process according to claim 1 in which the pH of the solution is maintained at a level of from 10 to 13.

7. A process according to claim 1 in which the solution comprises from 5 to 50% by weight of resin solids.

8. A process for the removal of epichlorohydrin and dichloropropanol impurities from a 10 to 30% aqueous solution of a resin which has a gel time as a 10% solids aqueous solution at ambient temperatures and a pH of 10 to 13 of at least 100 minutes and is the product of reacting epichlorohydrin with a polymer characterized by having a plurality of tertiary amine groups pendant from the polymer chain, said process comprising sparging the solution with an air stream while maintaining the temperature at from 15° to 25° C., the pressure at less than 0.5 kg/sq.cm and the pH at from 10 to 13.

* * * * *